(No Model.)
J. J. CHATTANAY & C. E. OWENS.
CAT GUARD.
No. 448,318. Patented Mar. 17, 1891.
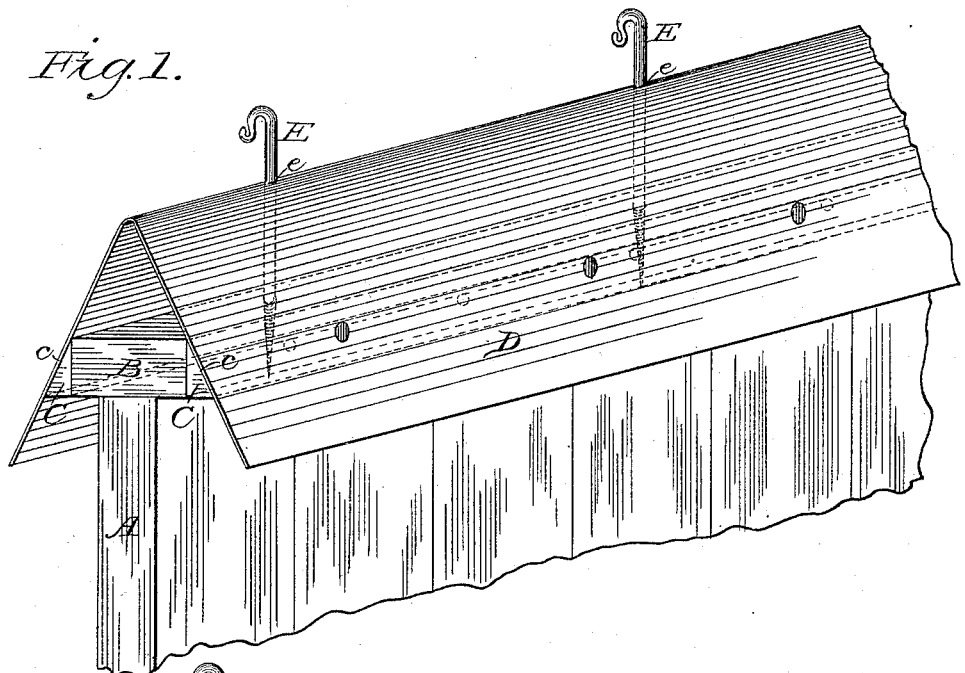
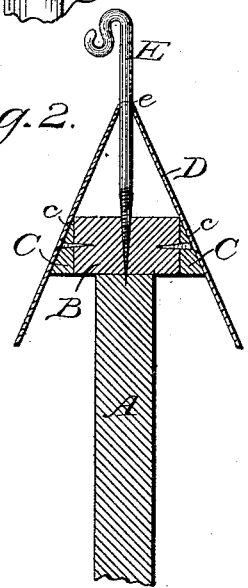
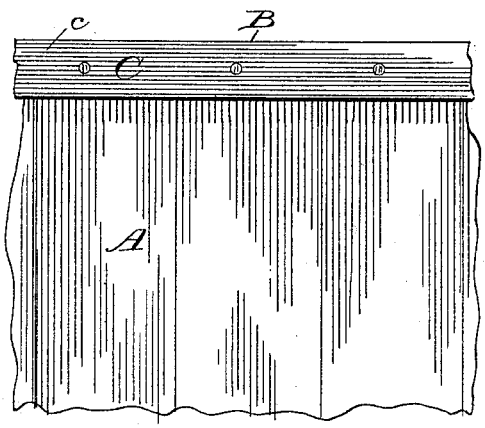
WITNESSES
Wm Musser
W Harvey Muzzy
INVENTOR
John J. Chattanay.
Charles E. Owens.
by W H Babcock
Attorney

UNITED STATES PATENT OFFICE.

JOHN JAMES CHATTANAY AND CHARLES ELLWOOD OWENS, OF PHILADELPHIA, PENNSYLVANIA.

CAT-GUARD.

SPECIFICATION forming part of Letters Patent No. 448,318, dated March 17, 1891.

Application filed August 19, 1890. Serial No. 362,397. (No model.)

*To all whom it may concern:*

Be it known that we, JOHN JAMES CHATTANAY and CHARLES ELLWOOD OWENS, citizens of the United States, residing at Philadelphia, in the county of Philadelphia and State of Pennsylvania, have invented certain new and useful Improvements in Cat-Guards; and we do hereby declare the following to be a full, clear, and exact description of the invention, such as will enable others skilled in the art to which it appertains to make and use the same.

This invention relates to devices for preventing cats from climbing to the top of a fence and remaining thereon or crossing from one yard or other inclosure into another. These have sometimes taken the form of a double incline or double roof in cross-section like the letter V inverted, having the lower edges fastened to a crown-piece of a fence, the material of such double roof being of smooth sheet metal, which will not allow the cat's claws to take hold upon it. These animals are nevertheless so nimble, that if they are allowed to reach the cap-piece of the fence proper, with nothing to exclude them from the incline, they may successfully scramble to the ridge or apex of the double roof and scream there or descend on the other side. To guard against this we extend the lower edges of the plate or plates forming this roof considerably below the said cap-piece, continuing their incline downward and outward, so that a cat cannot reach it from the wooden part of the fence, and on reaching the cap-piece will find itself shut in by the inner face of the downwardly-extending metal. This constitutes the chief feature of our present improvement; but the invention comprises, also, some additional advantageous novelties of construction and combination, all as hereinafter particularly set forth and claimed.

In the acccompanying drawings, Figure 1 represents a perspective view of part of a fence and its cat-guard embodying our invention, and Fig. 2 represents a vertical transverse section of the same. Fig. 3 represents a side view of one of the cleats as applied.

A designates the body of an ordinary closed board fence, and B a horizontal cap-piece fastened thereon, giving it the form of the letter T. To the sides of this cap-piece we fasten by tacks $b$ or any other convenient means a pair of cleats C, having inclined outer faces $c$.

D designates the inclined roof of sheet metal, preferably, though not necessarily, made in one piece and sloping each way, being attached near the middle of each side to these inclined outer faces for preserving the angle. The part D' of each side below said cap-piece is an effectual guard against climbing upon said roof, as the cat on reaching the lower face of said cap-piece is necessarily inclosed between said part D' and the fence, and is unable to reach the lower edge of the roof. The apex or ridge of said roof is perforated at intervals, forming a series of holes $e$, one of which is distinctly shown in Fig. 2, for the passage of the shanks of clothes-line hooks E. These are screw-threaded at their lower ends and turned into the wooden part of the fence.

Having thus described our invention, what we claim as new, and desire to secure by Letters Patent, is—

1. A fence-body A and cap-piece B, in combination with a double roof of smooth material extending downward and outward considerably below said cap-piece to prevent animals from climbing on the said roof, substantially as set forth.

2. In combination with the fence which supports it, the double roof or double incline D, provided in its ridge or apex with a series of perforations $e$, and the clothes-hooks E, which extend down through said perforations and are screwed into the wooden part of the fence, substantially as set forth.

In testimony whereof we affix our signatures in presence of two witnesses.

JOHN JAMES CHATTANAY.
CHAS. ELLWOOD OWENS.

Witnesses:
JOHN CRAWFORD HOGG,
WILLIAM TWEED.